US008825247B2

(12) United States Patent
Kim

(10) Patent No.: US 8,825,247 B2
(45) Date of Patent: Sep. 2, 2014

(54) SYSTEM FOR MANAGING BATTERY CHARGE OF ELECTRIC VEHICLE AND METHOD THEREOF

(75) Inventor: Ki Seok Kim, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 2 days.

(21) Appl. No.: 13/491,549

(22) Filed: Jun. 7, 2012

(65) Prior Publication Data

US 2013/0006461 A1 Jan. 3, 2013

(30) Foreign Application Priority Data

Jun. 30, 2011 (KR) .................. 10-2011-0064485

(51) Int. Cl.
*H02J 7/00* (2006.01)
*B60L 11/18* (2006.01)

(52) U.S. Cl.
USPC .............................. 701/22; 180/65.1; 903/903

(58) Field of Classification Search
USPC .............................. 701/22; 180/65.1; 903/903
See application file for complete search history.

(56) References Cited

U.S. PATENT DOCUMENTS

2009/0229900 A1 9/2009 Hafner et al.

FOREIGN PATENT DOCUMENTS

WO WO 2011/156776 A2 * 12/2011 ............... H02J 7/00

OTHER PUBLICATIONS

Kim, H. Lee, J. Park, G. Kang, M. and Kang, M., "An Efficient Scheduling Scheme on Charging Stations for Smart Transportation", 2010, Springer-Verlag Berlin Heidelberg, pp. 274-278.*

* cited by examiner

*Primary Examiner* — Mary Cheung
*Assistant Examiner* — Brian P Sweeney

(57) ABSTRACT

Disclosed are a system and a method for managing battery charge of an electric vehicle according to the present invention. A system for managing battery charge of an electric vehicle according to the present invention may include: a message processing unit to receive, from a management center, power information about a smart grid that supplies power, to receive, from a first user, user information for setting a charging condition, and to provide set charging information; a charging time/charging cost calculator to calculate a first charging tolerance time and a first charging cost of the first user who has requested charge according to a charging mode included in the user information; and a determining unit to select a charging time zone of a minimum cost within a tolerance time based on content calculated by the charging time/charging cost calculator, and to generate charging information.

18 Claims, 6 Drawing Sheets

SYSTEM FOR MANAGING BATTERY CHARGE OF ELECTRIC VEHICLE AND METHOD THEREOF

CROSS-REFERENCE TO RELATED APPLICATIONS

This application claims priority to and the benefit of Korean Patent Application No. 10-2011-0064485 filed in the Korean Intellectual Property Office on Jun. 30, 2011, the entire contents of which are incorporated herein by reference.

TECHNICAL FIELD

The present invention relates to an electric vehicle, and more particularly, to a system and a method for managing battery charge of an electric vehicle that may dynamically set a charging time based on electric charges according to a total power consumption amount of a desired charging time zone, when charging a battery of an electric vehicle.

BACKGROUND ART

Currently, environmental and energy resource issues have become hot topics and as a result, an electric vehicle and a plug-in hybrid vehicle are in the spotlight as future transportation means.

Power for battery charge of an existing hybrid electric vehicle has been supplied by driving a generator through a regenerative brake and an engine. However, the electric vehicle and the plug-in hybrid vehicle may be supplied with power for charging a battery from a national power network or a decentralized power supply system.

When the electric vehicle and the plug-in hybrid electric vehicle are used for commuting, a pattern of operation in the morning and charging in the evening significantly adversely affects the national power network or the decentralized power supply system in a predetermined time zone and increases the maximum power consumption amount of the entire power network.

When power greater than the maximum power consumption amount of the entire power network is used, additional generator installation is required for the current power system having a reserve rate of only about 10% and a large amount of electricity may be wasted, which decreases the energy efficiency.

Accordingly, a smart grid system for making a power network intelligent for energy efficiency and energy saving has been currently constructed. A bi-directional vertical supply system such as a micro grid system and the decentralized power supply system is being prepared beyond a vertical system in which electricity is supplied unilaterally from a central system.

A key point of the smart grid system is to enable information to be transmitted and received in real time between consumers and a power company by integrating information technologies such as ZigBee, power line communication, and the like, with the power network. The smart grid system may automatically operate in a corresponding time zone so that a consumer may use electricity when electric charges are cheap.

However, an existing apparatus for charging an electric vehicle immediately performs charging regardless of electric charges, and a charging request time has been focused, which may significantly adversely affect the national power network or the decentralized power supply system. On a user side, a user does not use electricity required for battery charge of an electric vehicle with inexpensive electric charges.

SUMMARY OF THE INVENTION

The present invention has been made in an effort to provide a system and a method for managing battery charge of an electric vehicle that may charge a battery of an electric vehicle at a minimum cost based on electric charges according to a total power consumption amount of a desired charging time zone when charging the battery of the electric vehicle, and may also dynamically set a charging time.

However, the object of the present invention is not limited to the above-noted description and other objects not described here may be clearly understood by those skilled in the art from the following description.

An exemplary embodiment of the present invention provides a system for managing battery charge of an electric vehicle, the system including: a message processing unit to receive, from a management center, power information about a smart grid that supplies power, to receive, from a first user, user information for setting a charging condition, and to provide set charging information; a charging time/charging cost calculator to calculate a first charging tolerance time and a first charging cost of the first user who has requested charge according to a charging mode included in the user information; and a determining unit to select a charging time zone of a minimum cost within a tolerance time based on content calculated by the charging time/charging cost calculator, and to generate charging information.

Another exemplary embodiment of the present invention provides a system for managing battery charge of an electric vehicle, the system including: a determining unit to generate first charging information including a first charging tolerance time and a first charging cost of a first user who has requested charge according to a charging mode included in user information for setting a charging condition from the first user, and then to verify whether there is a pre-registered second user having a movable charging tolerance time among users of which charging information is already generated; and a charging time/charging cost calculator to recalculate a second charging tolerance time of the second user according to movement of the charging tolerance time of the second user as the verification result, to recalculate a charging tolerance time of the first user after the charging tolerance time of the second user is moved, and to recalculate a second charging cost of the second user and the first charging cost of the first user. When a sum of recalculated charging costs of the first user and the second user is less than a sum of previously calculated charging costs of the first user and the second user, the determining unit may regenerate first charging information including the recalculated first charging tolerance time and first charging cost of the first user and second charging information including the recalculated charging tolerance time and charging cost of the second user.

When the charging mode is set to a reserved charging mode in which charging is freely performed within a set time, the charging time/charging cost calculator may set a charging amount using power information and the user information, may calculate the charging tolerance time, and in this instance, may calculate, as the charging tolerance time, a time zone in which the charging cost calculated by calculating a charging cost for each time zone is minimized.

When the charging mode is set to an immediate charging mode in which charging is immediately performed, the charging time/charging cost calculator may set a charging amount using power information and the user information, may calculate the charging tolerance time, and in this instance, may calculate a time from a current time as the charging tolerance time.

When at least two second users have the movable charging tolerance time, the determining unit may select the second user having a minimum sum of charging costs that is a sum of charging costs of the first user and the second user recalculated in regenerating charging information of all the second users and the first user, and may regenerate the first charging information and the second charging information.

Depending on necessity, the determining unit may distribute, between the first user and the second user, gains of total charging costs that are obtained based on regenerated charging information.

When power information is modified, the determining unit may verify whether there is the second user having the movable charging tolerance time among users of which charging modes are set. When a charging cost of the second user recalculated according to movement of the charging tolerance time of the second user is less than a previously calculated charging cost of the second user as the verification result, the determining unit may regenerate charging information including the recalculated charging tolerance time and charging cost of the second user.

Power information may include differential electric charges or each time zone with respect to a smart grid and differential electric charges according to a total power consumption amount.

The user information may include a charging means identifier(ID) for identifying a charging means, a user ID for identifying a user, battery information indicating a type or a characteristic of a battery, a charging mode indicating an immediate charging mode for immediate charging or a reserved charging mode for charging at a reserved time, a charging amount indicating an amount desired to be charged, an available charging time indicating a desired charging time zone, and whether a charging tolerance time is movable indicating whether preset charging information is changeable according to another user or a change in electric charges.

The first charging tolerance time and the second charging tolerance time may be consecutive times or discontinuous times.

Still another exemplary embodiment of the present invention provides a method of managing battery charge of an electric vehicle, the method including: receiving, by a message processing unit from a management center, power information about a smart grid that supplies power, and receiving, from a first user, user information for setting a charging condition; generating, by a determining unit, first charging information including a first charging tolerance time and a first charging cost of the first user who has requested charge according to a charging mode included in the user information, and then verifying whether there is a pre-registered second user having a movable charging tolerance time among users of which charging information is already generated; recalculating, by a charging time/charging cost calculator, a second charging tolerance time of the second user according to movement of the charging tolerance time of the second user as the verification result, recalculating a charging tolerance time of the first user after the charging tolerance time of the second user is moved, and recalculating a second charging cost of the second user and the first charging cost of the first user; and regenerating, by a determining unit, first charging information including the recalculated first charging tolerance time and first charging cost of the first user and second charging information including the recalculated charging tolerance time and charging cost of the second user when a sum of recalculated charging costs of the first user and the second user is less than a sum of previously calculated charging costs of the first user and the second user.

The recalculating may include setting, by the charging time/charging cost calculator, a charging amount using the power information and the user information, calculating the charging tolerance time, and in this instance, calculating, as the charging tolerance time, a time zone in which the charging cost calculated by calculating a charging cost for each time zone is minimized, when the charging mode is set to a reserved charging mode in which charging is freely performed within a set time.

The recalculating may include setting, by the charging time/charging cost calculator, a charging amount using the power information and the user information, calculating the charging tolerance time, and in instance, calculating a time from a current time as the charging tolerance time, when the charging mode is set to an immediate charging mode in which charging is immediately performed.

The regenerating may include selecting, by the determining unit, the second user having a minimum sum of charging costs that is a sum of charging costs of the first user and the second user recalculated in regenerating charging information of all the second users and the first user, and regenerating the first charging information and the second charging information, when at least two second users have the movable charging tolerance time.

The method may further include distributing, by the determining unit between the first user and the second user, gains of total charging costs that are obtained based on regenerated charging information.

The regenerating may include verifying, by the determining unit, whether there is a user having a movable charging tolerance time among users of which charging modes are set, when the power information is modified, and regenerating, by the determining unit, charging information including the recalculated charging tolerance time and charging cost of the user when a charging cost of the user recalculated according to movement of the charging tolerance time of the user is less than a previously calculated charging cost of the user as the verification result.

The power information may include electric charges for each time zone with respect to the smart grid or for each total power consumption amount.

The user information may include a charging means ID for identifying a charging means, a user ID for identifying a user, battery information indicating a type or a characteristic of a battery, a charging mode indicating an immediate charging mode for immediate charging or a reserved charging mode for charging at a reserved time, a charging amount indicating an amount desired to be charged, an available charging time indicating a desired charging time zone, and whether a charging tolerance time is movable indicating whether a preset charging tolerance time is changeable according to another user or a change in electric charges.

The first charging tolerance time and the second charging tolerance time may be consecutive times or discontinuous times.

According to exemplary embodiments of the present invention, by dynamically setting a charging time based on electric charges according to a total power consumption amount of a desired charging time zone when charging a battery of an electric vehicle, it is possible to prevent consumption of charging power from being focused during a predetermined time zone and to optimize a charging cost of a group scale.

According to exemplary embodiments of the present invention, by dynamically setting a charging time based on electric charges according to a total power consumption amount of a desired charging time zone when charging a battery of an electric vehicle, it is possible to stably operate a system.

According to exemplary embodiments of the present invention, by dynamically setting a charging time based on electric charges according to a total power consumption amount of a desired charging time zone when charging a battery of an electric vehicle, even a user side may charge the battery of the electric vehicle with inexpensive electric charges.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
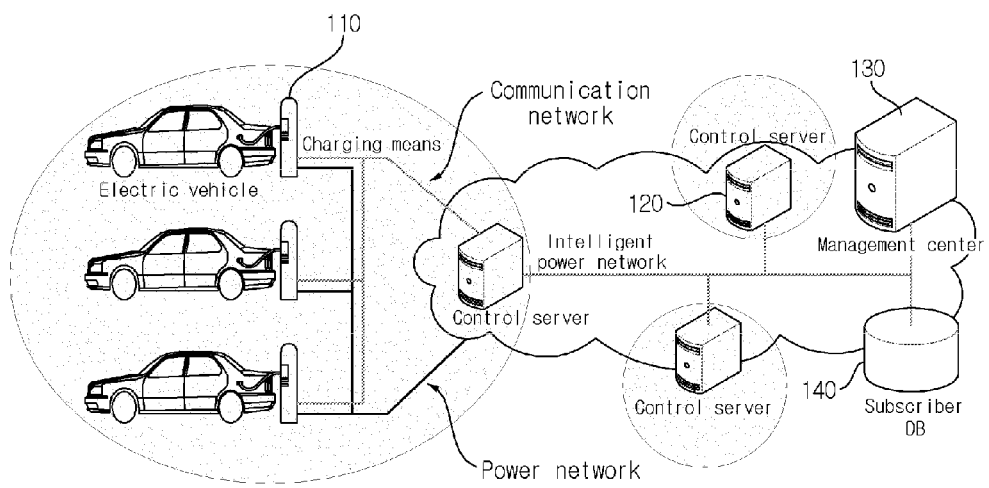
FIG. 1 is a diagram illustrating a system for managing battery charge according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a system and a method for managing battery charge of an electric vehicle according to exemplary embodiments of the present invention will be described in detail with reference to the accompanying FIGS. 1 through 7. A detailed description will be made based on a portion required to understand an operation and a function according to the present invention. Like reference numerals disclosed in the respective drawings refer to like elements throughout the present specification.

The present invention proposes a method that may dynamically set a charging time based on electric charges according to a total power consumption amount of a desired charging time zone when charging a battery of an electric vehicle in a smart grid. Here, the smart grid refers to a next generation intelligent power network that may optimize the energy usage efficiency by grafting an information technology onto an existing power network and thereby enabling information to be bi-directionally exchanged between a power supplier and a consumer in real time.

FIG. 1 is a diagram illustrating a system for managing battery charge according to an exemplary embodiment of the present invention.

As shown in FIG. 1, the system for managing battery charge according to the present invention may include a plurality of charging means 110, a control server 120, a management center 130, a subscriber database (DB) 140, and the like. Here, the charging means 110 may be connected to the control server 120 over a communication network.

The charging means 110 may request charge by receiving user information from a user who needs battery charge of an electric vehicle and by providing the received user information to the control server 120. When the charging means 110 is provided with charging information from the control server 120, the charging means 110 may control the battery charge of the electric vehicle based on the provided charging information.

Here, the charging means 110 may directly receive user information from the user through a separate input unit and may also be provided with charging information using a separate electronic device provided within the electric vehicle, for example, an electronic control unit (ECU), a navigation system, a terminal interworking with the navigation system, and the like.

Here, the user information is information for setting a charging condition, and may include a charging means identifier (ID), a user ID, battery information, a charging mode, a charging amount, an available charging time, whether a charging tolerance time is movable, and the like.

Briefly describing, 1) the charging means ID is a parameter for identifying a charging means, 2) the user ID is a parameter for identifying a user, 3) the battery information is a parameter that indicates a type or a characteristic of a battery, 4) the charging mode is a parameter that indicates an immediate charging mode for immediate charging or a reserved charging mode for charging at a reserved time, 5) the charging amount is a parameter that indicates an amount desired to be charged, 6) the available charging time is a parameter that indicates a desired charging time zone, and 7) whether the charging tolerance time is movable is a parameter that indicates whether a preset charging tolerance time is changeable in response to a charging request of a new user, a change in electric charges, and the like.

Even though the above user information may be directly provided from the user, data pre-stored in a vehicle may also be collected by the charging means 110.

The control server 120 may manage a group scale of charging means 110. The control server 120 may calculate a charging tolerance time and the like considering a charging cost, using power information that is provided from the management center 130, user information that is provided from the charging means 110, and the like, and may generate charging information including the calculated charging tolerance time, charging cost, and the like. The control server 120 may provide the generated charging information to the charging means 110 for charging the corresponding electric vehicle. Here, the charging tolerance time may include a charging start time, a charging end time, a charging continue time, and the like. The charging tolerance time may include at least one time zone.

In this instance, the control server 120 may be provided based on each region unit to manage a charging means positioned in a corresponding region.

Figure 2:
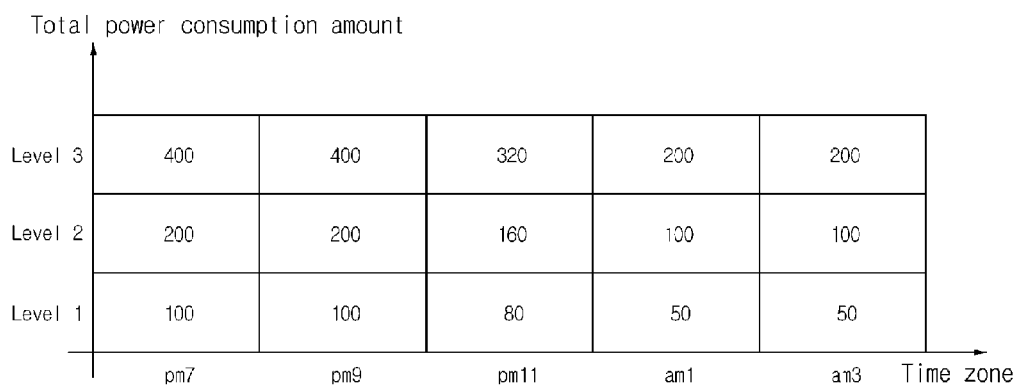
FIG. 2 is a diagram illustrating electric charges according to a total power consumption amount for each time zone according to an exemplary embodiment of the present invention.

FIG. 2 is a diagram illustrating electric charges for each time zone and electric charges according to a total power consumption amount according to an exemplary embodiment of the present invention.

FIG. 2 shows electric charges for each time zone and according to a total power consumption amount in power information provided from the management center 130. Electric charges may vary based on levels classified according to a total power consumption amount as well as electric charges differentiated for each time zone. For example, 1) referring to a total power consumption amount in the same time zone, it can be known that when a total power consumption amount corresponds to level 1 at 7 p.m. (pm7), electric charges is 100 won/1 Kw, when a total power consumption amount corresponds to level 2, electric charges is 200 won/1 Kw, and when a total power consumption amount corresponds to level 3, electric charges is 400 won/1 Kw.

2) Referring to each time zone in level 1 of a total power consumption amount, electric charges is 100 won/1 Kw at 7 p.m. (pm7), electric charges is 100 won/1 Kw at 9 p.m. (pm9), electric charges is 80 won/1 Kw at 11 p.m. (pm11), electric charges is 50 won/1 Kw at 1 a.m. (am1), and electric charges is 50 won/1 Kw at 3 a.m. (am3).

The management center 130 may manage a plurality of control servers 120 positioned within a smart grid, and may share power information with the plurality of control servers 120. That is, every time power information is changed or updated, the management center 130 may provide the changed power information to the plurality of control servers 120.

Here, the power information may include differential electric charges according to a total power consumption amount, a current power supply state, and power section information managed by each control server 120, in addition to electric charge information for each time zone or according to a total power consumption amount, that is, differential electric charges for each time zone with respect to a smart grid.

The management center 130 may perform user authentication.

The subscriber DB 140 may store information, for example, a user ID and the like, that may be used to authenticate a user who has joined a battery charging service of the electric vehicle.

Figure 3:
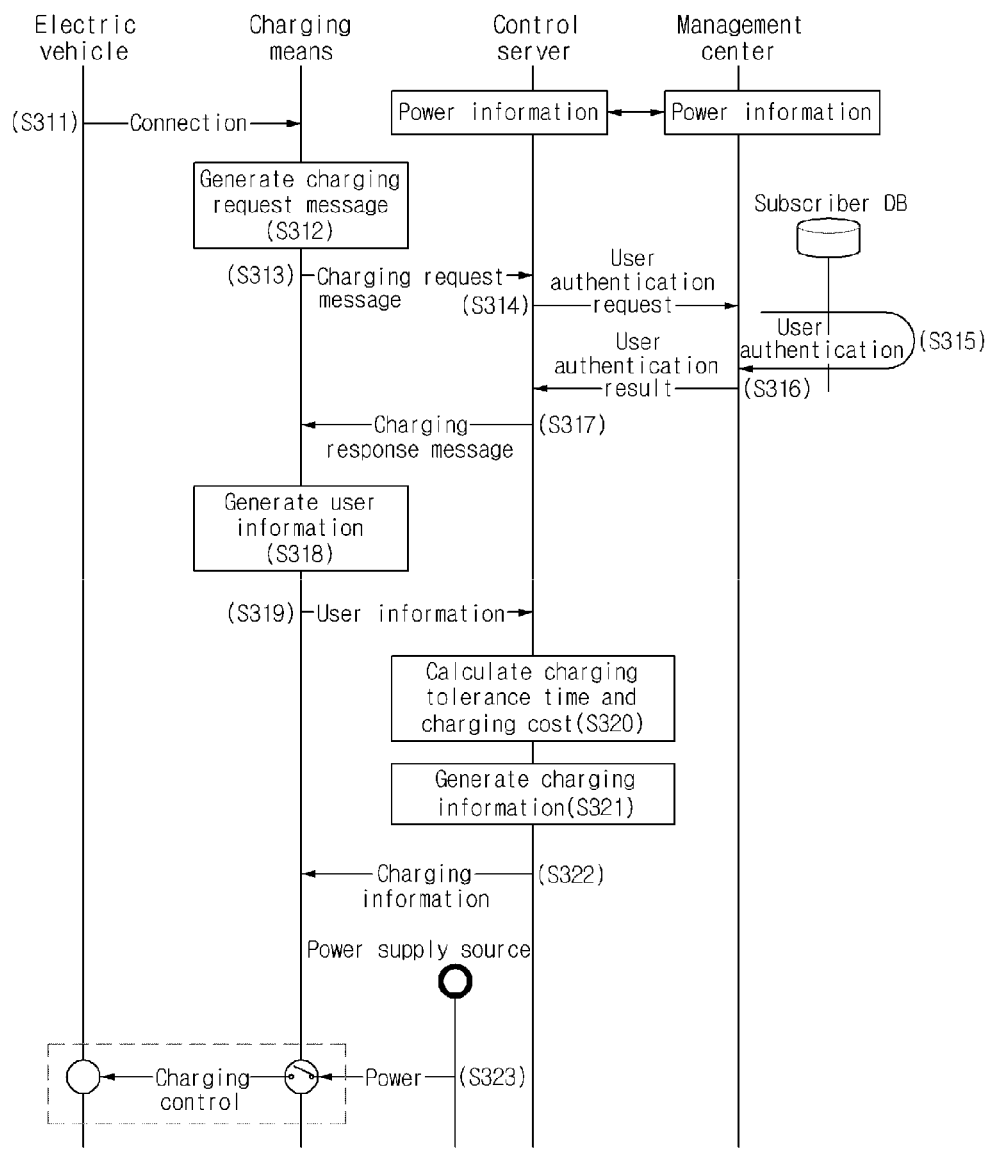
FIG. 3 is a diagram illustrating a method of managing battery charge of a control server according to an exemplary embodiment of the present invention.

FIG. 3 is a diagram illustrating a method of managing battery charge of a control server according to an exemplary embodiment of the present invention.

As shown in FIG. 3, a management center provides power information to a control unit. When an electric vehicle is connected to a charging means (S311), the charging means may generate a charging request message in response to a charging request of a user (S312), and may transmit the generated charging request message to the control server (S313). Here, the charging request message may include a charging means ID, a user ID, and the like.

Next, the control server may request a user authentication by receiving the charging request message and by providing, to the management center, the user ID included in the received charging request message (S314).

The management center may perform an authentication process through a subscriber DB using the provided user ID (S315) and then provide the authentication result to the control server (S316).

As the user authentication is performed, the control server may generate a charging response message as a response to the charging request message and may transmit the generated charging response message to the charging means (S317).

Next, when the charging means receives the charging response message, the charging means may generate user information (S318) and may transmit the generated user information to the control server (S319).

Next, the control server may receive the user information, may verify a charging mode included in the received user information, and may calculate a charging tolerance time and a charging cost based on the verification result (S320). Specifically describing, when the charging mode included in the user information is set to an immediate charging mode, the control server may calculate a time from a current time as the charging tolerance time and may calculate a charging cost with respect to the calculated charging tolerance time. On the other hand, when the charging mode is set to a reserved charging mode, the control server may verify an available charging time included in the user information, and may calculate, as the charging tolerance time, a time zone having a minimum charging cost among charging costs that are calculated by calculating a charging cost for each time zone within the verified available charging time. When a plurality of time zones has the same charging cost in calculating an optimal time zone, the control server may calculate a most preceding time zone as the charging tolerance time.

In this instance, the charging tolerance time may be a consecutive time and may also be a discontinuous time. For example, when a user sets the available charging time as eight hours from 10 p.m. to 6 a.m., a time from a current time to 6 a.m. of the following day, and the like, and sets a required charging amount as 6 KWh by setting of 80% charging and the like for the battery usage efficiency, and when the user uses a single power charger of 2 KW (200V/10 A) level, a charging time may be three hours. The charging time may be set to be a time from 0 a.m. to 2 a.m., and a time from 3 a.m. to 4 a.m.

Next, the control server may generate charging information including the calculated charging tolerance time and charging cost (S321), and may transmit the generated charging information to the corresponding charging means (S322).

Next, when the charging means receives the charging information, the charging means may inform the user by displaying the charging cost and the charging tolerance time included in the received charging information, and the user may select whether to start charging or may automatically execute a charging control.

When the user selects a charging start, the charging means may control power that is supplied from a power supply source in order to charge the battery of the electric vehicle (S323). That is, the charging means may charge the battery by controlling a start point in time and an end point in time of power that is supplied from the power supply source to the electric vehicle, based on the charging tolerance time included in the charging information.

Figure 4:
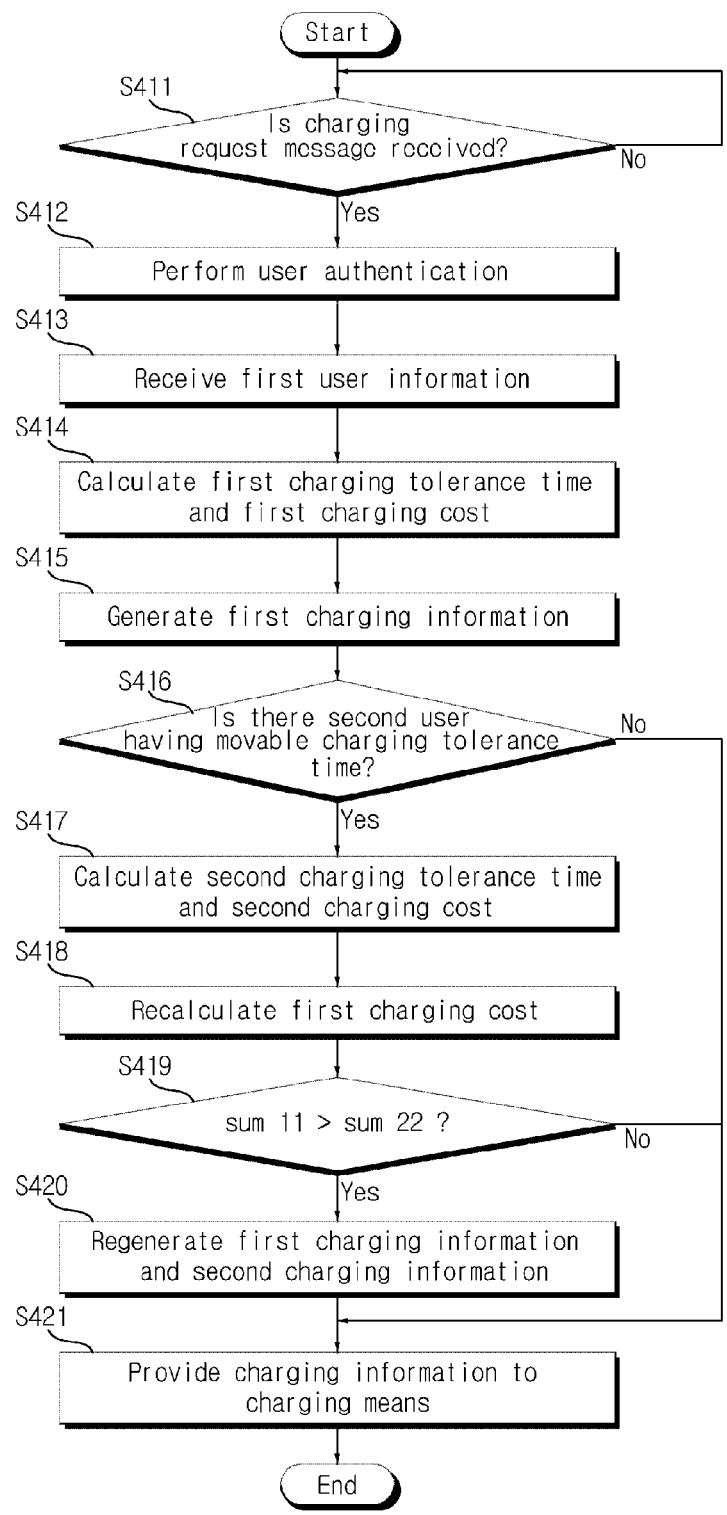
FIG. 4 is a diagram illustrating a method of managing battery charge of a control server according to another exemplary embodiment of the present invention.

FIG. 4 is a diagram illustrating a method of managing battery charge of a control server according to another exemplary embodiment of the present invention.

As shown in FIG. 4, when a management center and the control server share power information, and when the control server receives a charging request message of a first user from a charging means (S411), the control server may perform user authentication through a subscriber DB using a first user ID included in the received charging request message (S412). In this instance, the subscriber DB may store information, for example, a user ID, and the like, that may be used to authenticate a user who has joined a battery charging service of an electric vehicle.

Next, when the user authentication is completed, the control server generates a charging response message as a response to the charging request message, transmits the generated charging response message to the charging means, and then terminates an authentication process.

The above authentication process may be omitted when a user requests charging at a personal house.

Next, the control server may receive first user information from the charging means (S413), and may verify a charging mode included in the received first user information. That is, the control server may calculate a first charging tolerance time Time11 and a first charging cost Cost11 based on the charging mode included in the first user information (S414).

In this instance, when the charging mode included in the first user information is set as an immediate charging mode, the control server may set a required charging amount and calculate the first charging tolerance time Tim11 from a current time and may calculate the first charging cost Cost11 with respect to the calculated first charging tolerance time Time11. On the contrary, when the charging mode is set as a reserved charging mode, the control server may verify an available charging time included in the first user information, set a required charging amount, calculate a charging cost for each time zone within the available charging time, and thereby may calculate, as the first charging tolerance time Time11, a time zone having a minimum charging cost Cost11 among the calculated charging costs. The control server may generate first charging information including the calculated first charging tolerance time Time11 and the first charging cost Cost11 (S415).

Next, the control server may search for a pre-registered second user and may verify a user having a movable charging tolerance time among the found second users (S416).

When verifying whether the second user has the movable charging tolerance time, the control server needs to verify whether the available charging time of the second user is movable within a condition included in second user information, for example, within the range of available charging time and the like.

When at least one second user has the movable charging tolerance time as the verification result, the control server may recalculate an existing second charging tolerance time Time21 and second charging cost Cost21 of the second user as a second charging tolerance time Time22 and a second charging cost Cost22 according to movement of the allowable charging time (S417). On the contrary, when there is no second user having the movable charging tolerance time as the verification result, the control server may generate charging information including the initially calculated first charging cost Cost11 and first charging tolerance time Time11 of the first user.

Next, the control server may search for a new charging tolerance time Time12 of the first user according to movement of the charging tolerance time of the second user and may recalculate a charging cost Cost12 of the first user (S418).

Next, the control server may verify whether a sum sum22 of the recalculated charging cost Cost12 of the first user and charging cost Cost22 of the second user is less than a sum sum11 of the previously calculated charging costs Cost11 and Cost21 (S419). That is, when the sum sum22 is less than the sum sum11 of previous charging costs as the verification result, the control server may regenerate first charging information of the first user and second charging information of the second user (S420). Here, the first charging information may include the charging cost Cost12 and the first charging tolerance time Time12 of the first user, and the second charging information may include the second charging cost Cost22 and the second charging tolerance time Time22.

On the contrary, when the sum sum22 is greater than the sum sum11 of previous charging costs as the verification result, the control server may generate charging information including the initially calculated first charging cost Cost11 and first charging tolerance time Time11 of the first user.

Here, the above process may be applied to all the users that are already registered and have a movable charging tolerance time, and charging information may be reset by selecting a user of which sum sum22 of recalculated charging costs corresponds to a lowest price.

During the above process, when the sum sum22 of recalculated charging costs is less than the sum sum11 of previous charging costs, the control server may reset charging information and thereby may prevent frequent reallocation from occurring when gain is not great.

Next, the control server may transmit the generated charging information to the charging means or the user (S421).

When the charging information is reset during the above process, the control server may function to distribute and thereby charge a saved portion of charging cost to the first user and the second user, or to request the management center.

Here, when searching for the pre-registered second user, the control server may search for the second user in a case where a level of a total power consumption amount is changed within the same time zone. Through the above process, the present invention may prevent users from being focused in a predetermined time zone and may enable users to perform charging at the cheapest cost in the case of large scale charging.

Figure 5:
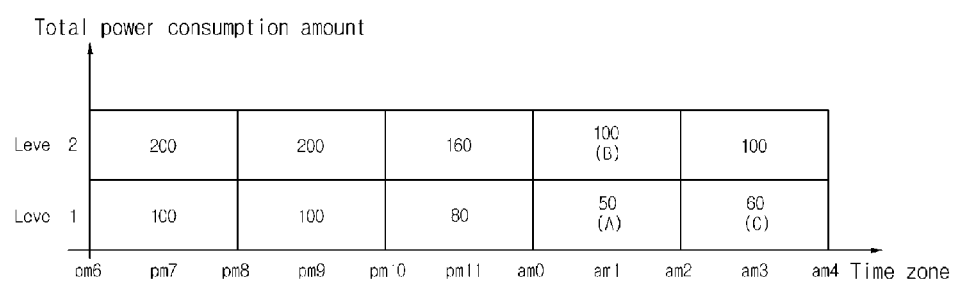
FIG. 5 is a diagram to describe a principle of recalculating a charging cost according to an exemplar embodiment of the present invention.

FIG. 5 is a diagram to describe a principle of recalculating a charging cost according to an exemplar embodiment of the present invention.

As shown in FIG. 5, when a second user is positioned in an area A and is reserved to charge at cost of 50 won/Kw from 0 a.m. to 2 a.m., a first user may also desire to charge from 0 a.m. to 2 a.m. In this case, when level 1 of a total power consumption amount is exceeded, the first user may be positioned in an area B to thereby charge at cost of 100 won/Kw from 0 a.m. to 2 a.m.

In this instance, when there is a user having a movable charging tolerance time among second users who have reserved to charge from 0 a.m. to 2 a.m., and when an available charging time is by 4 a.m., the corresponding second user may move to an area C and a charging tolerance time may be recalculated from 2 a.m. to 4 a.m. and a charging cost may be recalculated from 50 won/Kw to 60 won/Kw. Next, the first user may move to the region A, whereby the charging tolerance time may be reset from 0 a.m. to 2 a.m. and the charging cost may be recalculated as 50 won/Kw.

That is, a sum sum11 of previously calculated charging costs of the first user and the second user is 150 won/Kw(=50 won/Kw+100 won/Kw), and a sum sum22 of recalculated charging costs is 110 won/Kw(=60 won/Kw+50 won/Kw). Therefore, it can be known that the reset charging cost is 40 won/Kw cheaper compared to the previously calculated charging cost. In this case, the control server may reset existing charging information of the second user and new charging information of the first user.

In this instance, the charging cost of the first user decreases from 100 won/Kw to 50 won/Kw, whereas the charging cost of the second user increases from 50 won/Kw to 60 won/Kw. Accordingly, the present invention may also support the second user with a portion of the decreased charging cost of the first user at a compensation level.

As described above, the present invention may perform dynamic power allocation such that requirements from a plurality of users may be satisfied while maintaining a given power environment in an optimal state.

Figure 6:
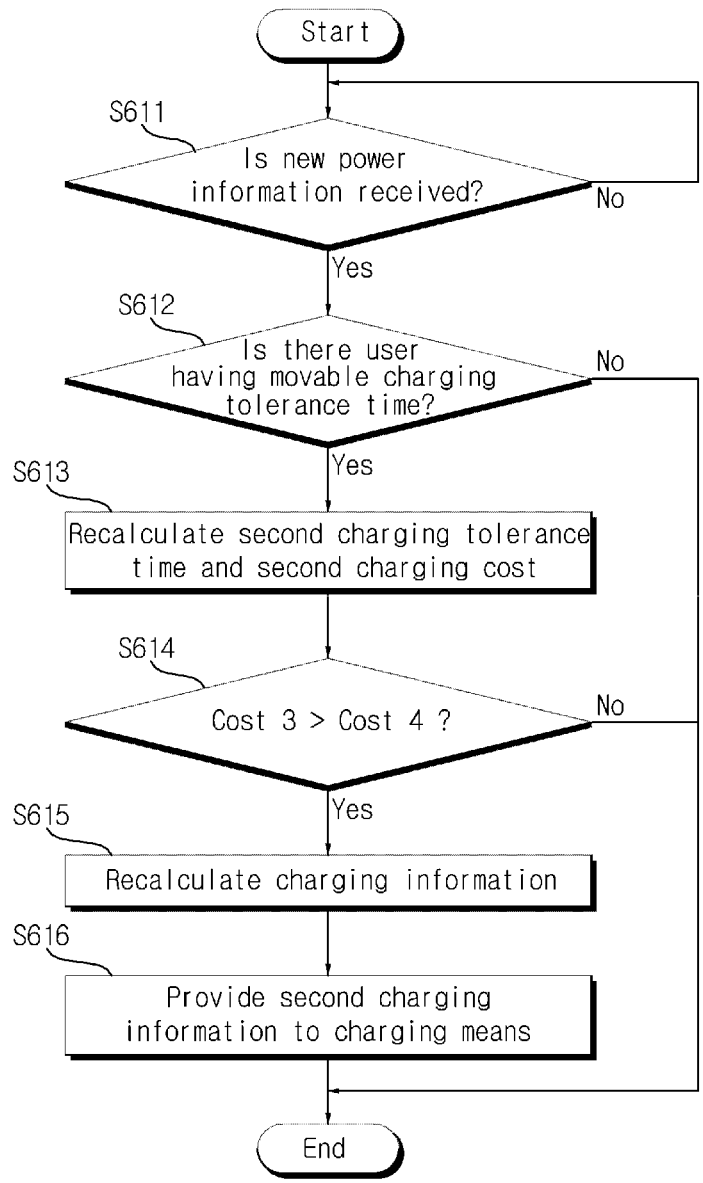
FIG. 6 is a diagram illustrating a method of managing battery charge of a control server according to still another exemplary embodiment of the present invention.

FIG. 6 is a diagram illustrating a method of managing battery charge of a control server according to still another exemplary embodiment of the present invention.

As shown in FIG. 6, when a management center and the control server share power information, and when the control server is provided with new power information (S611), the control server may verify whether there is a user having a movable charging tolerance time among users who are set to charge (S612).

Next, when at least one user has the movable charging tolerance time as the verification result, the control server may recalculate a new fourth charging tolerance time Time4 and a fourth charging cost Cost4 based on a preset third charging tolerance time Time3 and third charging cost Cost3 of the user (S613). On the contrary, when there is no user having the movable charging tolerance time as the verification result, the control server may terminate all the predetermined processes.

Next, the control server may verify whether the recalculated charging cost Cost4 is less than the previously calculated charging cost Cost3 (S614). That is, when the recalculated charging cost Cost4 is less than the previously calculated charging cost Cost3 as the verification result, the control server may determine that there is gain and may regenerate charging information of the user (S615). On the contrary, when the recalculated charging cost Cost4 is greater than the previously calculated charging cost Cost3 as the verification result, the control server may terminate all the predetermined processes.

Next, the control server may transmit the generated charging information to the charging means or the user (S616).

Here, even though the exemplary embodiment of the present invention describes only a case where only a single user has a movable charging tolerance time, the present invention is not limited thereto and may be also applied to a case where a plurality of users has a movable charging tolerance time.

Figure 7:
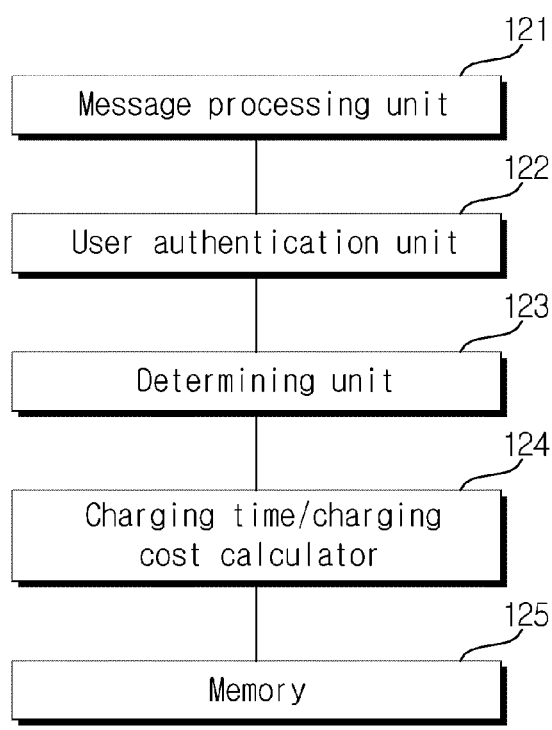
FIG. 7 is a diagram illustrating a detailed configuration of a control server of FIG. 1.

FIG. 7 is a diagram illustrating a detailed configuration of the control server 120 of FIG. 1.

As shown in FIG. 7, the control server 120 according to the present invention may include a message processing unit 121, a user authentication unit 122, a determining unit 123, a charging time/charging cost calculator 124, a memory 125, and the like.

The message processing unit 121 may receive a charging request message from a charging means, may generate a charging response message as a response to the received charging request message, and then may transmit the generated charging response message to the charging means. The message processing unit 121 may control the user authentication unit 122, the determining unit 123, the charging time/charging cost calculator 124, the memory 125, and the like, during a charging process.

The message processing unit 121 may be provided with power information from a management center.

When the charging request message is received, the user authentication unit 122 may transmit the charging request message to the management center using a user ID included in the received charging request message, and may perform authentication using a subscriber DB in the management center. Next, the charging request message may be transmitted to the control server.

In this instance, an authentication process in a general house may be omitted.

The determining unit 123 may verify a charging mode included in user information. 1) When the charging mode is set to an immediate charging mode, the charging time/charging cost calculator 124 may calculate a time from a current time as a charging tolerance time and may calculate a charging cost with respect to the calculated charging tolerance time. 2) When the charging mode is set to a reserved charging mode, the charging time/charging cost calculator 124 may calculate a charging cost for each time zone within the available charging time and may calculate, as the charging tolerance time, a time zone minimizing the calculated charging cost.

The determining unit 123 may verify whether another user of which charging mode is set within a time zone, including the charging tolerance time through setting of the charging mode of the user who has requested charge, has a movable charging tolerance time. The charging time/charging cost calculator 124 may recalculate a charging tolerance time and a charging cost of the other user having the movable charging tolerance time as the verification result.

When verifying whether the user has the movable charging tolerance time, the determining unit 123 needs to verify whether the charging tolerance time of the user is within a condition included in the user information, for example, within the range of available charging time and the like.

The determining unit 123 may generate charging information including the calculated charging cost and charging tolerance time, and may transmit the generated charging information to the charging means or the user through the message processing unit 121. The determining unit 123 may distribute, between the first user and the second user, gain of total charging costs that is obtained based on the regenerated charging information.

Power information provided from the management center may be stored in the memory 125. When charging, the power information may be stored by matching a calculated charging cost and charging tolerance time for each of at least one user.

In this instance, even though the present invention describes a case where charging power provided to the charging means is used as fixed unit power, the present invention is not limited thereto and thus, may be applied to a case where power supply sources are diversified or where power of a predetermined power supply source is variably used.

As described above, a system and a method for managing battery charge of an electric vehicle according to the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the speci-

What is claimed is:

1. A system for managing battery charge of an electric vehicle, the system comprising a control server including a processor and a non-transitory computer readable medium, wherein the processor executes computer program instructions embodied in the non-transitory computer readable medium to perform the steps of:
receiving a first charging request of a first user;
generating first charging information including a first charging tolerance time and a first charging cost according to a charging mode included in user information associated with the first user and power information including on or more time zones;
determining a pre-registered second user having a movable second charging tolerance time among users of which charging information is already generated;
recalculating the second charging tolerance time of the pre-registered second user according to movement of the second charging tolerance time, recalculating the first charging tolerance time after the second charging tolerance time is moved, recalculating a second charging cost of the second user, and recalculating the first charging cost;
when a sum of the recalculated first and second charging costs is less than a sum of a sum of the previously calculated first and second charging costs, regenerating the first charging information including the recalculated first charging tolerance time and the recalculated first charging cost and regenerating the second charging information including the recalculated second charging tolerance time and the recalculated second charging cost; and
transmitting the first charging information.

2. The system of claim 1, wherein when the charging mode is set to a reserved charging mode in which charging is freely performed within a set time, setting a charging amount using the power information and the user information, and calculating an optimal time zone having a minimized charging cost calculated using a charging cost for each of the one or more time zones.

3. The system of claim 1, wherein when the charging mode is set to an immediate charging mode in which charging is immediately performed, setting a charging amount using the power information and the user information, and calculating the first charging tolerance time from a current time.

4. The system of claim 1, wherein when at least two second users have the movable charging tolerance time, selecting the second user having a minimum sum of charging costs that is a sum of charging costs of the first user and the second user recalculated in regenerating charging information of all the second users and the first user, and regenerating the first charging information and the second charging information.

5. The system of claim 1, further comprising distributing, between the first user and the second user, gains of total charging costs that are obtained based on regenerated charging information.

6. The system of claim 1, wherein when power information is modified:
determining a third user having a movable charging tolerance time among users of which charging modes are set;
recalculating a third charging tolerance time of the third user;
recalculating a third charging cost of the third user according to the third charging tolerance time; and
when the recalculated third charging cost is less than a previously calculated charging cost of the third user, regenerating a third charging information including the recalculated third charging tolerance time and the recalculated third charging cost.

7. The system of claim 1, wherein the power information includes differential electric charges for at least one of the one or more time zones with respect to a smart grid and differential electric charges according to a total power consumption amount.

8. The system of claim 1, wherein the user information includes one or more of a charging means identifier (ID) for identifying a charging means, a user ID for identifying a user, battery information indicating a type or a characteristic of a battery, a charging mode indicating an immediate charging mode for immediate charging or a reserved charging mode for charging at a reserved time, a charging amount indicating an amount desired to be charged, an available charging time indicating a desired charging time zone, and whether a charging tolerance time is movable indicating whether preset charging information is changeable according to another user or a change in electric charges.

9. The system of claim 1, wherein the first charging tolerance time and the second charging tolerance time are consecutive times or discontinuous times.

10. A computer-implemented method of managing battery charge of an electric vehicle, the method comprising:
receiving, from a management center, power information about a smart grid that supplies power, the power information including one or more time zones;
receiving, from a first user, user information for setting a charging condition;
generating first charging information including a first charging tolerance time and a first charging cost of the first user who has requested charge according to a charging mode included in the user information;
determining a pre-registered second user having a movable charging tolerance time among users of which charging information is already generated;
recalculating a second charging tolerance time of the second user according to movement of the charging tolerance time of the second user;
recalculating the first charging tolerance time after the second charging tolerance time is moved, and recalculating a second charging cost of the second user and the first charging cost; and
when a sum of recalculated first and second charging costs is less than a sum of the previously calculated first and second charging costs, regenerating the first charging information including the recalculated first charging tolerance time and the recalculated first charging cost, and regenerating the second charging information including the recalculated charging tolerance time and the recalculated second charging cost.

11. The method of claim 10, wherein when the charging mode is set to a reserved charging mode in which charging is freely performed within a set time, recalculating the first or second charging tolerance time comprises setting a charging amount using power information and user information, and calculating an optimal time zone having a minimized charging cost calculated using a charging cost for each of the one or more time zones.

12. The method of claim 10, wherein when the charging mode is set to an immediate charging mode in which charging is immediately performed, recalculating the first or second charging tolerance time comprises setting a charging amount using the power information and the user information, and calculating a time from a current time.

13. The method of claim 10, wherein when at least two second users have the movable charging tolerance time, selecting the second user having a minimum sum of charging costs that is a sum of charging costs of the first user and the second user recalculated in regenerating charging information of all the second users and the first user, and regenerating the first charging information and the second charging information of the selected second user.

14. The method of claim 10, further comprising:
distributing, between the first user and the second user, gains of total charging costs that are obtained based on regenerated charging information.

15. The method of claim 10, wherein when the power information is modified, determining a third user having a movable charging tolerance time among users of which charging modes are set, and when a charging cost of the third user recalculated according to movement of the charging tolerance time of the third user is less than a previously calculated charging cost of the third user, regenerating third charging information including the recalculated charging tolerance time and the recalculated charging cost of the third user.

16. The method of claim 10, wherein the power information includes electric charges for at least one of the one or more time zones with respect to the smart grid or for each total power consumption amount.

17. The method of claim 10, wherein the user information includes one or more of a charging means ID for identifying a charging means, a user ID for identifying a user, battery information indicating a type or a characteristic of a battery, a charging mode indicating an immediate charging mode for immediate charging or a reserved charging mode for charging at a reserved time, a charging amount indicating an amount desired to be charged, an available charging time indicating a desired charging time zone, and whether a charging tolerance time is movable indicating whether a preset charging tolerance time is changeable according to another user or a change in electric charges.

18. The method of claim 10, wherein the first charging tolerance time and the second charging tolerance time are consecutive times or discontinuous times.

* * * * *